April 12, 1966   W. R. IRWIN   3,245,687
PLAYING CARDS WITH SUPERIMPOSABLE TRANSPARENT
AND INDICIA-BEARING AREAS
Filed Nov. 17, 1961   4 Sheets-Sheet 1

Inventor
William R. Irwin

April 12, 1966　　　　W. R. IRWIN　　　3,245,687
PLAYING CARDS WITH SUPERIMPOSABLE TRANSPARENT
AND INDICIA-BEARING AREAS
Filed Nov. 17, 1961　　　　　　　　　4 Sheets-Sheet 2

Inventor
William R. Irwin

April 12, 1966  W. R. IRWIN  3,245,687
PLAYING CARDS WITH SUPERIMPOSABLE TRANSPARENT
AND INDICIA-BEARING AREAS
Filed Nov. 17, 1961  4 Sheets-Sheet 3

INVENTOR.

*William R. Irwin*

April 12, 1966 W. R. IRWIN 3,245,687
PLAYING CARDS WITH SUPERIMPOSABLE TRANSPARENT
AND INDICIA-BEARING AREAS
Filed Nov. 17, 1961 4 Sheets-Sheet 4

INVENTOR.

*William R. Irwin*

United States Patent Office 3,245,687
Patented Apr. 12, 1966

3,245,687
PLAYING CARDS WITH SUPERIMPOSABLE TRANSPARENT AND INDICIA-BEARING AREAS
William R. Irwin, New York, N.Y. (1034 Tiffany St., P.O. Box 155, Boulevard Station, Bronx County, N.Y.)
Filed Nov. 17, 1961, Ser. No. 153,186
20 Claims. (Cl. 273—152.1)

This application is a continuation in part of my application Serial No. 665,966, filed June 17, 1957, and now Patent No. 3,016,243.

The present invention relates to a playing card game and more particularly to such a game employing a deck or set of playing cards each of which have certain areas which are opaque and other areas which are open or transparent and in which the game is played by superimposing one card over another or by partially superimposing one or more cards over another or others.

One of the objects of the invention is to provide a card game which will be educational and interesting to both adult and juvenile players.

Another object is to provide a word game, the playing of which will be dependent upon the ingenuity and spelling ability of the players.

Still another object is to provide a group of cards with transparent or window type areas, in which the window areas of the cards will be of an identical or complementary pattern, and which, therefore may be inexpensively produced, and with the cards forming the group being each of the same size and with said group comprising the entire plurality of cards in the deck if it is so desired.

A further object is to provide an additional group or deck of cards, member card of said group being combinable with each other and with cards of the aforesaid plurality and each member card of said additional group being of the same shape and overall size as cards of the aforesaid plurality and each card having opaque and window areas but differing from cards of the said plurality in other respects.

Other objects and advantages will hereinafter appear.

In accordance with the present invention the opaque areas of the cards are provided with displays, such as letters of the alphabet, the opaque and transparent areas being so related geometrically that the cards may be superimposed on each other with their edges either in alignment or in a predetermined offset relation with a transparent area of one card over an opaque area of another card to form scoring combinations of the delineations imprinted or otherwise depicted on opaque areas of two or more cards.

In one embodiment of the invention herein disclosed the opaque and transparent or open areas of each card of the deck or plurality are of the same size and shape and are disposed in a symmetrical pattern over the surfaces of the cards. In one arrangement for this embodiment the opaque and transparent areas of some cards are disposed in complementary or reversed position relative to others, that is, when the opaque areas with delineations formed thereon of the card surfaces are disposed upwardly, whereby one card may be superimposed over another with the edges of both cards being in alignment and with the transparent areas of the upper card over the opaque areas of the underneath card so that the composite display consists of the delineated opaque areas of both cards.

In one of the preferred embodiments of the invention the opaque and transparent areas of each member of the group or deck of cards are arranged in a plurality of horizontal and vertical rows with the opaque and transparent areas alternating in each row whereby, when one transparent area of a card is disposed over an opaque area of another card, each of the remaining superimposed transparent areas of the upper card will be aligned over an opaque area of a lower card, irrespective of whether the edges of the cards are in alignment or offset either horizontally or vertically or both.

The cards may be marked on one side only or, if desired, the delineations may appear on both sides of the opaque areas so that the reverse surfaces of each card forms a complementary pattern to the obverse surface or face of the card.

The invention will best be understood by having reference to the accompanying drawings, in which.

Figure 9:
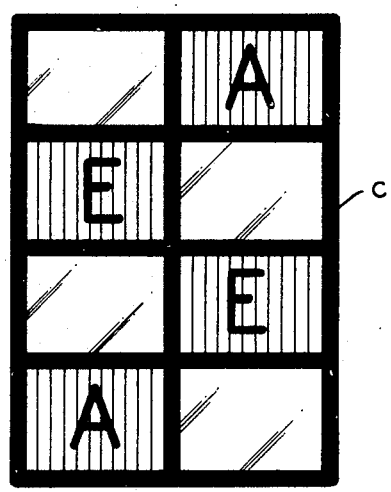
FIGS. 9 and 10 illustrate the face and reverse sides of a card also usable in the game.
Figure 10:
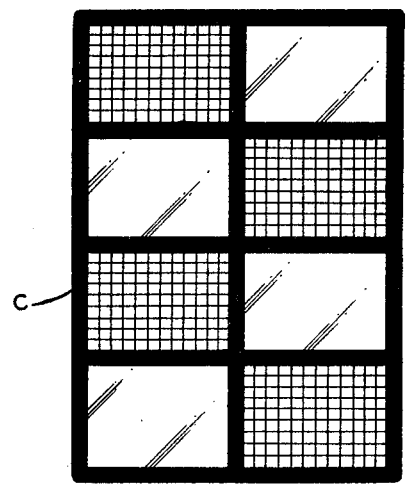
Figure 11:
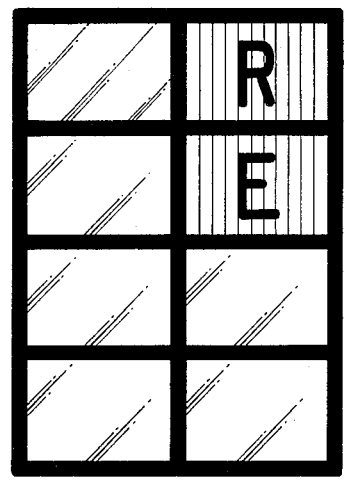
Figure 12:
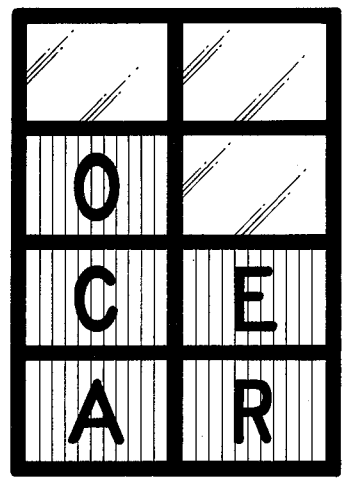

FIGS. 11 and 12 depict cards of the additional group mentioned on page 2, paragraph 6, each of which has outside dimensions and opaque areas of the same geometrical size as those cards shown in FIGS. 1 to 10, but unlike the last said cards the cards of FIGS. 11 and 12 have their opaque areas disposed in irregular order.

Figure 13:
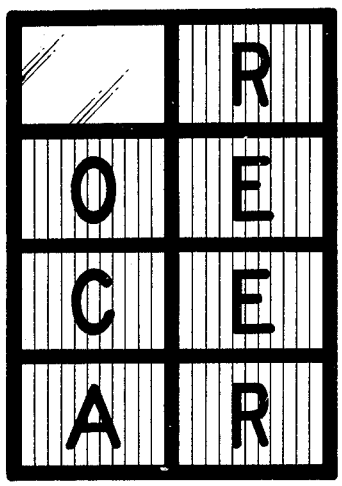
Figure 14:
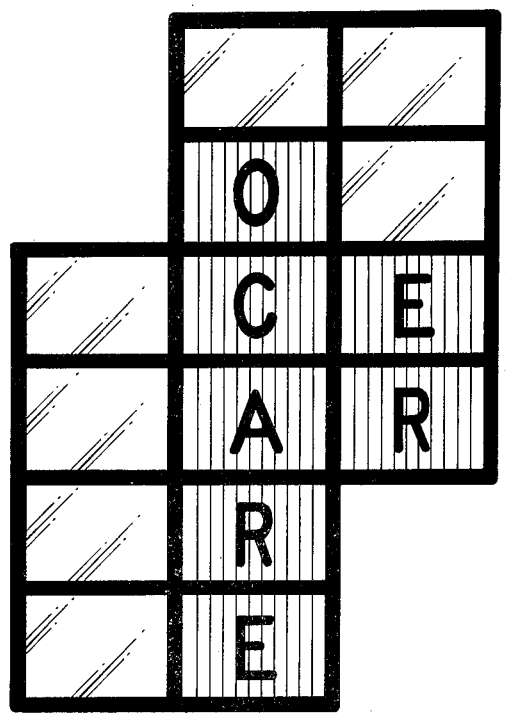
Figure 15:
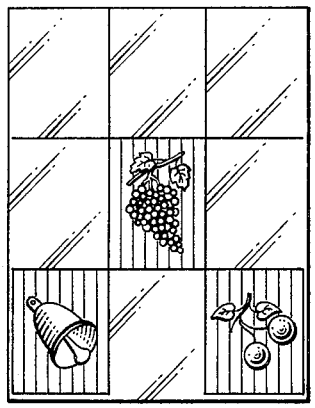
Figure 16:
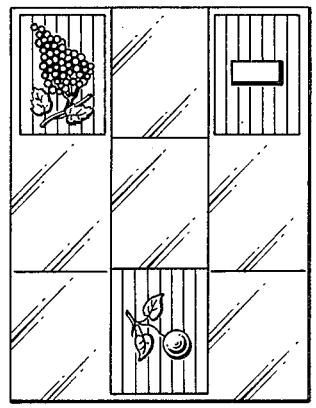
Figure 17:
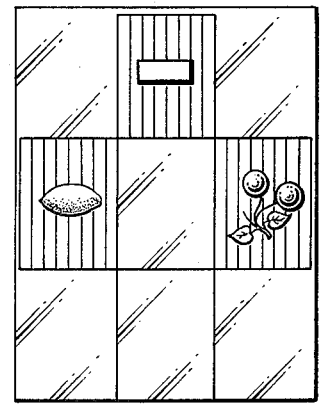

FIGS. 13 and 14 show the card of FIG. 11 as being completely superimposed and partially superimposed respectively over the card of FIG. 12;

FIGS. 15, 16 and 17 depict a group of three cards, each with opaque and window entities of the same size, which are combinable in a number of different ways.

Figure 1:
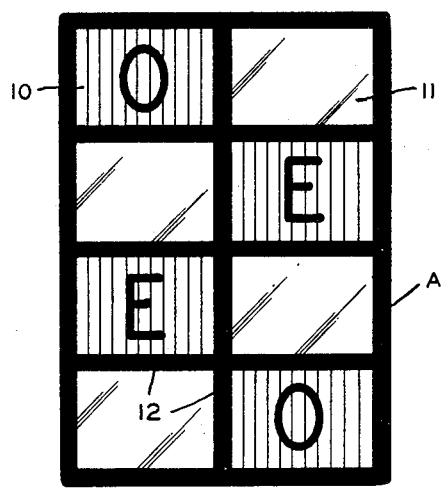
FIGS. 1 and 2 depict one side of a pair of cards usable in the card game.
Figure 2:
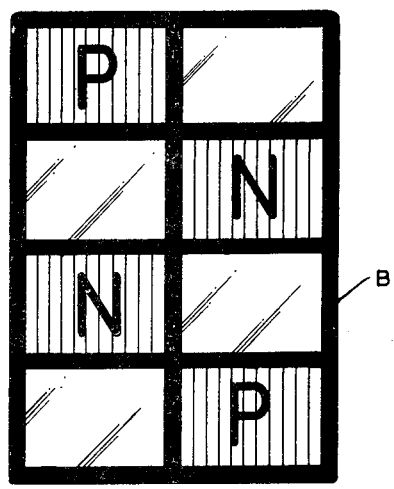

Referring first to FIGS. 1 and 2, each of the cards "A" and "B" there shown consists of transparent sheet material, such as a suitable stiff plastic. These cards are illustrative of a larger plurality of cards of identical size, shape and pattern, each of the cards being divided into a plurality of horizontal and vertical rows having opaque areas 10 alternating with transparent areas or window areas 11. The opaque areas may be produced on the cards by printing or other method and may be of any desired color or design. While contrasting divisional and border markings 12 are shown, it is to be understood that the margins of the opaque areas 10 may define the opaque and transparent areas and that any border markings other than the limits of the opaque play surfaces wherein delineations may be imposed, may be dispensed with. Displays, shown in the form of letters of the alphabet, are disposed upon the opaque play areas 10.

The displays, used primarily to illustrate the concept, consist of unrelated letters of the alphabet so selected, that by filling in other suitable letters in the window areas of one card by placing in register therewith opaque areas with delineations imposed thereon of another card or other cards, words or parts of words may be formed. This filling is accomplished by placing one card upon another in one of the manners to be described in more detail.

Displays, other than letters of the alphabet, could of course be employed whereby other combinations of figures or composite figures would be formed. It will be noted that the opaque areas, aside from the marginal lines 12, are of the same size and shape as the window areas so that when a window area of one card is placed over an opaque area of another card, said window area will just be filled by said opaque area. It will be further noted that the arrangement of the opaque areas and the window areas of each of the card faces shown in FIGS. 1 and 2 is identical so that the opaque play areas of all cards having this particular arrangement of opaque play areas and transparent or window areas may be printed by the same opaquing process and it requires only that different letters of the alphabet be imprinted on the opaque play areas of the various cards making up the deck or the card group or plurality.

Figure 3:
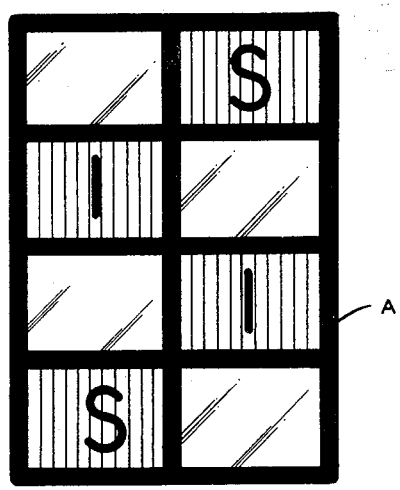
FIGS. 3 and 4 depict the reverse sides of the cards of FIGS. 1 and 2 respectively.
Figure 4:
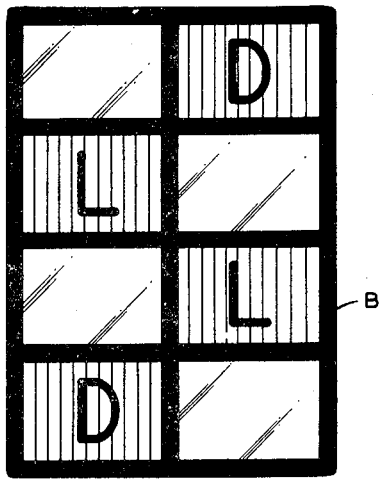

FIGS. 3 and 4 illustrate the reverse sides of the cards "A" of FIG. 1 and "B" of FIG. 2 and, as will be noted, these sides have a complementary arrangement to the opaque and window areas of the opposite sides of the cards. This factor will become apparent when comparison of the card as illustrated in FIG. 1 is made with that of the card illustrated in FIG. 3, or when the card depicted in FIG. 2 is compared with the card shown in FIG. 4.

Figure 5:
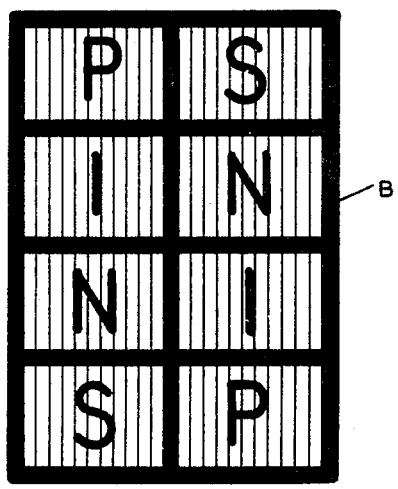
FIGS. 5, 6, 7 and 8 illustrate different arrangements of one card fully or partially superimposed upon another.

The various manners whereby these cards may be combined to form words is illustrated in FIGS. 5 to 8 and, in which FIG. 5 shows how the card "B" of FIG. 2 may be disposed over the card "A" of FIG. 3 or, vice versa, with all the edges of both cards in alignment, thereby to form two complete words, reading up and down, by the combining of interspersed alphabetical characters in vertical rows.

Figure 6:
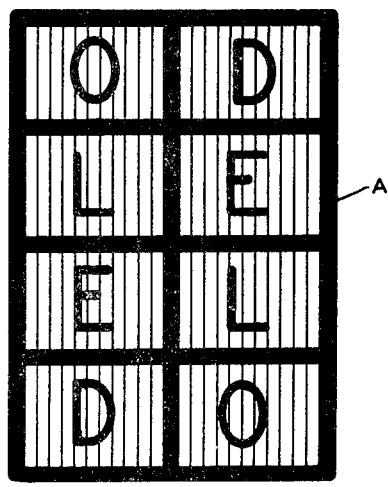

FIG. 6 illustrates a different card arrangement with the card "A" of FIG. 1 being completely superimposed over the card "B" of FIG. 4. The resulting combinations of letters form only one word in common use when said letters are read in vertical order, but when they are read in irregular or zigzag order the words "DEED," "Old" and "DELL" are formed The arrangement of the cards shown in FIG. 5 could be considered as a major scoring combination whereas the arrangement illustrated in FIG. 6 might be considered as a minor scoring combination.

Figure 7:
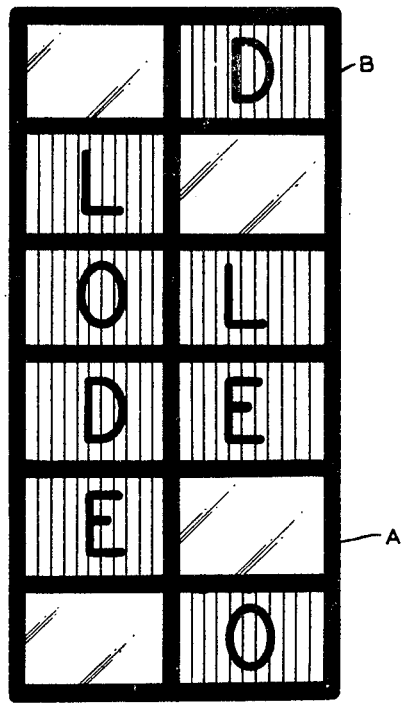

In FIG. 7 the card faces depicted in FIGS. 1 and 4 are again combined but one card is only partially superimposed upon the other and a scoring combination is provided by shifting the card "B" of FIG. 4 upwardly with respect to card "A" of FIG. 1 thereby to form the word "LODE."

Figure 8:
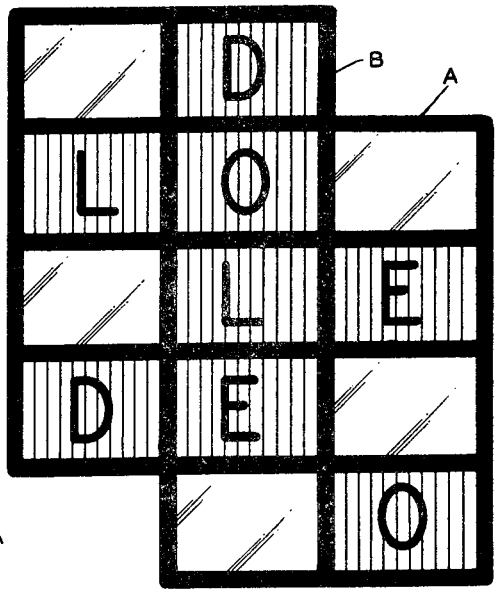

FIG. 8 again shows the cards of FIGS. 1 and 4 with the same faces disposed upwards but with the said cards shifted both vertically and horizontally, whereby the combination of imprinted delineations forms the word "DOL" when reading vertically and downwardly. It will of course be understood that additional cards may be added, either in partial alignment with the cards as depicted in FIG. 7 or offset with respect thereto as shown in FIG. 8, to form additional words in either the horizontally or vertically formed rows, or in both. Thus if the card face depicted in FIG. 9 were to be partially superimposed over the card combination illustrated in FIG. 6 with the lowermost letter "A" of the card of FIG. 9 obscuring the letter "E" in the upper right position of the card combination shown in FIG. 6 the word "LADE" would be formed reading vertically and upwards and the word "ODE" would be formed reading horizontally and from left to right. In this way and in the manner described, a very large number of word combinations and scoring possibilities are obtainable with only a moderate number of cards by allowing the player or players to continuously build up card combinations over an extended area by offsetting each card added with respect to another or others already played.

The card face "C" depicted in FIG. 9 is of the same general pattern as the card faces shown in FIGS. 3 and 4 and the card of said FIG. 9 differs from those of FIGS. 3 and 4 in having delineations imprinted only on the opacities of the face depicted in the figure. The reverse surface of the card of FIG. 9, with the opaque play areas having no delineations or insignia imprinted thereon, is formed as depicted in FIG. 10.

When the cards have delineations imprinted on the opacities of only one surface, face or side, it is advantageous to the extent that the cards are completely indistinguishable from each other when the card faces bearing delineations on the opacities thereof are disposed with said opacities and delineations downwardly, as when dealing or drawing from the deck. Such cards are particularly suitable for children because cards of this type are not complex and are well adapted for games requiring less concentration.

The word game depicted in the embodiments is in general, illustrative of the invention, and may be played in a variety of ways, such as, for example, by the players, each in turn, drawing a card from the deck and endeavoring to combine it with a card or cards previously drawn or dealt, scoring being effected in accordance with the number of words formed or according to the number of letters used in the word formation, and if it is desired, with extra points being given for employing common letters used in the formation of a plurailty of words at one time.

It will be understood of course, that modifications may be made in the pattern layout of the opaque areas employed and in certain other details without departing from the essential spirit and attributes of the invention.

The cards shown in the FIGS. 11 to 14 serve to add additional facets to the game for the older and more competitive player. The use of cards such as is depicted in FIG. 11 or 12 makes it obvious that superimposing one of said cards upon the other as is illustrated in FIG. 13, wherein the card depicted in FIG. 11 is completely superimposed over the card depicted in FIG. 12, that a completely opaque surface cannot be presented to the view. However, even though the number of opaque portions and transparent portions may be unequal on each of two cards of this type, it is apparent that by superimposing one card of this type over another, and with each card having a greater number of opaque portions than transparent portions, such as two cards of the kind shown in FIG. 12, that direct superimposition of one such card upon the other could easily result in the presentation of a completely opaque surface. Of course, in the instance mentioned, one card would have to be turned 180 degrees and two opaque portions of the topmost card would cover two opaque portions of the lowermost card.

FIG. 14 shows another grouping of the cards of FIGS. 11 and 12. In this instance the opaque play areas of card 11 have delineations printed on each surface of the two opaque portions. In FIG. 11 an "R" is shown in the top right opacity and immediately underneath same is depicted the letter "E." On the opposite surfaces of the opaque portions the letters "R" and "E" are again used but the letter "E" occupies the top opacity and the letter "R" is depicted immediately below. Thus when the card of FIG. 11 is reversed so that the uppermost surface becomes lowermost and the card is turned 180 degrees it may enter into combination with the card of FIG. 12 as shown in FIG. 14. The various word groups formed by the letters of the two cards in the combinations, formed as depicted in FIG. 14, including letters used diagonally in sequence are: "RE, CARE, RARE, REAR, EAR, ERR, RACE, ERA," etc.

FIGS. 15, 16 and 17 depict a group of three cards, said cards differing, either individually or in combination, from the cards depicted in the FIGURES 1 to 14.

The cards of FIGS. 1 to 14 have either an equal number of opaque and transparent areas, or, the opaque areas outnumber the transparent areas of equal size, or, the opaque areas are outnumbered by transparent areas of equal size, but one of the basic factors of said cards is that they contain an even number in combination of opaque and transparent areas.

The cards depicted in FIGS. 15, 16 and 17 have an odd number of equally sized opaque and transparent areas. If the said areas of the three cards of FIGS. 15, 16 and 17 were equal in size to the opaque and transparent areas of the cards of FIGS. 1 to 14, it is obvious that said cards, of the FIGS. 15, 16 and 17, would consequently, have to be of a smaller overall size, unless the border and divisional markings of the last said cards were of greater area than the borders and divisional markings of the cards depicted in FIGS. 1 to 14.

Nevertheless, cards with many of the physical characteristics of the cards depicted in the FIGS. 15, 16 and 17 could be employed to advantage with the cards illustrated in FIGS. 1 to 14.

In the FIGS. 15, 16 and 17, it is readily apparent that as the disposition of the opaque portions on each of the cards depicted are situated differently, that it would take three cards, one each of the types shown in FIGS. 15, 16 and 17, directly superimposed one over another, the edges of the three cards being all in alignment, and with the cards being in stacked relationship to each other, lowermost, median situated and uppermost, in order to present a completely opaque surface with delineations depicted thereon, within the dimensional area of only one of the aforesaid cards.

It is apparent that the cards of FIGS. 15, 16 and 17 could be changed to a large extent insofar as the disposition of opaque portions might vary with the disposition of transparent portions and that the only real differentiation between the group of card depicted in FIGS. 15, 16 and 17 and the cards shown in the FIGS. 1 to 10 might be said to be whether the cards have an even number of equally sized opaque and transparent surfaces or an odd, or uneven number of equally sized opaque and transparent surfaces; or, whether it requires a minimum of two cards, one directly superimposed over the other, the edges of both cards being in alignment, or, in the case of cards of the types shown in FIGS. 15, 16 and 17, that it requires a minimum of three cards, one underlying, one in the median or sandwich position, and one overlying, the edges of the three cards in alignment, to present a completely opaque surface to the viewer within the area that would be occplied by only one card.

Considering the cards of FIGS. 11 and 12, whether the opacities of said cards have delineations imposed thereon, on only one side, or on both sides, of each card, that the irregular disposition or disproportionate relationship of opaque to transparent surfaces of equally sized areas is inherent in principle to the cards depicted in the FIGS. 15, 16 and 17, is beyond doubt. In such case, the cards depicted in the FIGURES 1 to 14 must be considered as relating to but one embodiment of the present invention and the cards, depicted in FIGS. 15, 16 and 17, should be construed as relating to a different invention.

In this respect it should be pointed out that Patent No. 2,911,220, granted to me, involving playing cards with opaque and transparent areas, requires that at least two of the cards described in the invention be stacked with the edges of the plurality in aligned relationship.

Now, having described and illustrated my invention I do not wish to be limited in the applications or ramifications thereof except as defined in the appended claims.

What I claim is:

1. A set of playing cards, each card of said set having a plurality of opaque, play areas and a plurality of transparent, window areas, each opaque, play area of each card and each transparent, window area of each card being substantially of the same size and shape, each card of said set having an obverse side and a reverse side, the opaque, play areas of the reverse sides of said cards completely concealing the opaque, play areas of the obverse sides of said cards when said obverse sides are turned downwards and said reverse sides are turned upwards, delineations being disposed on the opaque, play areas of the obverse sides of said cards, and when a first card of said set is turned upwards with its opaque, play areas with delineations disposed thereon exposed to the view and a second card of said set is turned upwards with its opaque, play areas with delineations disposed thereon exposed to the view and said second card is imposed over said first card in one of a multitude of positions whereby, with one or more of the transparent, window areas of said second card in register with one or more of the opaque, play areas of said first card, one of a multitude of composite delineations possible to effect by imposing said second card in any of a variety of positions of register over said first card will result.

2. A set of playing cards as defined in claim 1 in which the pattern formed by said opaque, play areas and transparent window areas comprise a plurality of horizontal and vertical rows of alternating opaque and transparent areas.

3. The combination of a set of playing cards, each card having the same dimensions, the flat surfaces of each card considered as a first side and a second side, each card of said set having a plurality of opaque, play areas and a plurality of transparent, window areas, the opaque, play areas of the first sides of some of the cards of said set having delineations depicted thereon, the opposite second side opacities to said first sides completely concealing said delineations when said first sides are turned downwardly, the second sides of the remainder of said set of playing cards having delineations depicted thereon and last said second sides serving as the play sides of the said remainder, the opposite first side opacities to last said second sides completely concealing said delineations depicted on said second sides when said second sides of said remainder of said set of cards are turned downwardly, each of the said opaque, play areas of every card of said set and each of the transparent, window areas of every card of said set having the same size, shape and dimensions and being disposed in a like geometric pattern whereby a first card with delineations depicted upon the opaque, play areas of the first side thereof may be placed with said delineations facing upwards, and a second card having delineations depicted upon the opaque play areas of the second side thereof may be placed with said second side upwards in complete superimposition over said first card, the delineations upon the opaque play areas of said first and second cards forming a composite delineation.

4. A set of playing cards as defined in claim 3 in which said geometric pattern consists of horizontal and vertical rows of alternating opaque and transparent areas.

5. A set of playing cards each having a plurality of opaque, play areas and a plurality of transparent, window areas, said opaque play areas and said transparent, window areas of all cards of said set being of substantially equal size and shape, said opaque, play areas being disposed in alternating relationship with said transparent, window areas on each card in a plurality of horizontal rows and in a plurality of vertical rows, the opaque, play areas of each card having delineations disposed thereon on the obverse face thereof, the opaque, play areas on the obverse face of each card being completely masked by opaque areas on the reverse side thereof, the opaque, play areas on the obverse face of each card occupying same relative position as the opaque, play areas on the obverse faces of each other card of said set, and upon said play areas of two cards being turned upwards to the view, with one or more of the opaque, play areas or transparent, window areas of one card being in register with one or more of the opaque, play areas or transparent, window areas of the other card, and with one card being offset in partial superimposed relationship to the other card, one of a multitude of composite delineations result therefrom.

6. A set of playing cards as defined in claim 5 in which said opaque and transparent areas are rectangular in shape and disposed in checkerboard fashion.

7. A set of playing cards as defined in claim 3 in which said depicted delineations are letters of the alphabet.

8. A set of playing cards as defined in claim 5 in which said delineations are letters of the alphabet.

9. A set of playing cards as defined in claim 1 in which said delineations are letters of the alphabet.

10. A set of playing cards as defined in claim 1 in which the opaque, play areas and transparent areas of the card plurality may be of square configuration and any of two or three cards of said set enable the said plurality to be stacked variously with their playing surfaces uppermost and with the edges of the various cards in alignment in any of various positions to form variously a plurality of different composite delineations.

11. The combination of a set of playing cards, each card having a plurality of opaque areas and window areas, said areas of all cards being of substantially equal size and shape and disposed in a geometric pattern in which any card may be superimposed upon any other card of said set with some of none of the edges of the superimposed card being in alignment with the edges of the underlying card and with one or more of the window areas of the superimposed card in register with an opaque area of the underlying card whereby the opaque areas of both cards are exposed, each of said opaque areas of both cards having delineations depicted thereon whereby any two of said cards of said set may be arranged in a plurality of completely or partially superimposed relations to thereby combine the said delineations depicted on one card variously with the delineation depicted on another cards, to effect composite delineations of the overlying card and the underlying card, and in which the delineations depicted are disposed on each face of each card whereby said cards may be played with either face up to produce composite delineations.

12. A set of playing cards each having a plurality of opaque areas and transparent areas, said areas of all cards being of substantially equal size and disposed in a geometric pattern in which the transparent areas of each card may be positioned over the opaque areas of any other card in superimposed relation, said opaque areas of each card having delineations thereon which are combinable with delineations of a superimposed card to form a composite delineation, and in which said delineations are provided on each face of said cards on the opaque areas thereof whereby two of said cards may be superimposed either side up to form a composite design.

13. The combination of a set of playing cards, each card having a plurality of individual opaque areas and individual transparent areas, each of said opaque and transparent areas being of substantially equal size and configuration, the number of said opaque areas being disproportionate to the number of said transparent areas, each of the said opaque areas of each card having indicia delineated thereon whereby any two of the said plurality of cards may be arranged in any of a number of a plurality of superimposed relationships to combine the indicia characteristics of one card variously with the indicia characteristics of the other card to effect various composite indicia characters, and in which the opaque areas of the several cards have indicia delineated upon both flat surfaces of the opaque areas.

14. The combination of a set of playing cards, each card having a plurality of individual opaque areas and individual transparent areas, each of said opaque and transparent areas being of substantially equal size and configuration, the number of said opaque areas being disproportionate to the number of said transparent areas, each of the said opaque areas of each card having indicia delineated thereon whereby any two of the said plurality of cards may be arranged in any of a number of a plurality of superimposed relationships to combine the indicia characteristics of one card variously with the indicia characteristics of the other card to effect various composite indica characters, and in which the opaque and transparent areas unequal in number are arranged in a pattern in which said opaque and transparent areas are in alternating relationship whereby any two of said cards may be superimposed with one or more characters of one card disposed adjacent to one or more characters of the other card, and in which the opaque areas of the several cards have indicia delineated upon both flat surfaces of the opaque areas.

15. The combination of a set of playing cards, the flat surfaces of each card of said set having a plurality of opaque play areas and transparent window areas thereon, said opaque play areas and transparent window areas of all cards of said set being of substantially equal size and configuration and disposed in a geometric pattern by which any card of said set may be superimposed upon any other card of said set in any of a plurality of positional relationships, and with some or none of the edges of the superimposed card being in alignment with an edge or edges of an underlying card, and with one or more of the window areas of the superimposed card being in register with one or more of the opaque play areas of the underlying card whereby opaque play areas of both cards are exposed, the flat obverse surface opaque play areas of said cards having delineations imposable thereon, said delineations being exposed when said flat obverse surfaces are turned to the view, said delineations being concealed when said flat obverse surfaces are turned away from the view, and each card of said set arrangeable to form variously with any other card of said set any of a multiplicity of composite delineations.

16. The combination of a set of playing cards, the flat surfaces of each card of said set having a plurality of opaque play areas and transparent window areas thereon, said opaque play areas and transparent window areas of all cards of said set being of substantially equal size and configuration and disposed in a geometric pattern by which any card of said set may be superimposed upon any other card of said set in any of a plurality of positional relationships, and with some or none of the edges of the superimposed card being in alignment with an edge or edges of an underlying card, and with one or more of the window areas of the superimposed card being in register with one or more of the opaque play areas of the underlying card whereby opaque play areas of both cards are exposed, the flat obverse surface opaque play areas of said cards having delineations imposable thereon, said delineations being exposed when said flat obverse surfaces are turned to the view, said delineations being concealed when said flat obverse surfaces are turned away from the view, and each card of said set arrangeable to form variously with any other card of said set, or with other cards of said set, any of a multitude of composite delineations.

17. The combination of a set of playing cards, the flat surfaces of each card of said set having a plurality of opaque play areas and transparent window areas thereon, said opaque play areas and transparent window areas of all cards of said set being of substantially equal size and configuration and disposed in a geometric pattern by which any card of said set may be completely or partially superimposed upon any other card of said set in any of a plurality of positional relationships, and with some or none of the edges of the superimposed card being in alignment with an edge or edges of an underlying card, and with one or more of the window areas of the superimposed card being in register with one or more of the opaque play areas of the underlying card whereby opaque play areas of both cards are exposed, the flat obverse surface opaque play areas of said cards having delineations imposable thereon, said delineations being exposed when said flat obverse surfaces are turned to the view, said delineations being concealed when said flat obverse surfaces are turned away from the view, and each card of said set arrangable to form variously with any other card of said set any of a multitude of composite delineations.

18. The combination of a set of playing cards, the flat surfaces of each card of said set having a plurality of opaque play areas and transparent window areas thereon, said opaque play areas and transparent window areas of all cards of said set being of substantially equal size and configuration and disposed in a geometric pattern by which any card of said set may be completely or partially superimposed upon any other card of said set in any of a plurality of positional relationships, and with some or none of the edges of the superimposed card being in alignment with an edge or edges of an underlying card, and with one or more of the window areas of the superimposed card being in register with one or more of the opaque play areas of the underlying card whereby opaque play areas of both cards are exposed, the flat obverse opaque play areas of said cards having delineations imposable thereon, said delineations being exposed when said flat obverse surfaces are turned to the view, said delineations being concealed when said flat obverse surfaces are turned away from the view, and each card of said set arrangable to form variously with any other card of said set, or with other cards of said set, any of a multitude of composite delineations.

19. The combination of a set of playing cards, each card of said set having a plurality of opaque play areas and transparent window areas being of substantially equal size and shape and disposed in a geometric pattern by which any card may be superimposed over any other card of said set with some or none of the edges of the superimposed card being in alignment with edges of the underlying card, and with one or more transparent window areas of the superimposed card being in register with an opaque play area of said underlying card and whereby opaque play areas of both cards are exposed, the obverse flat surfaces of the cards of said set bearing delineations imposed on said opaque play areas and with the reverse flat surfaces of said cards having opacities showing thereon to conceal said delineations when said cards are turned with said obverse surfaces downwardly and with said reverse surfaces exposed upwardly to the view, whereby any two cards of said set may be arranged in any of a multiplicity of arrangements with the obverse flat surfaces of said cards turned upwards to the view, to combine the delineations disposed on the obverse surface of the underlying card with the delineations disposed on the obverse surface of the superimposed card, and to form any of a multitude of composite delineations.

20. A set of playing cards, with each card of said set having a plurality of opaque play areas and transparent window areas, said opaque play areas and transparent window areas being of substantially equal size and shape and disposed in alternating relationship in a plurality of horizontal and vertical rows in such manner that a plurality of said cards may be placed one over another in a variety of vertical or horizontal offset relationships or both, and with one or more transparent window areas of an overlying card registering with an equal number of opaque play areas of an underlying card or cards, delineations being disposed on the opaque play areas of the obverse flat surfaces of each of said cards, said delineations being masked by opacities showing on the reverse flat surfaces of said cards, and whereby an expanding area of cards having continuous rows of composite dilineated characters may be built up one card at a time with the obverse surfaces of said cards turned upwards to the view.

References Cited by the Examiner

UNITED STATES PATENTS

| | | | |
|---|---|---|---|
| 942,536 | 12/1909 | Bartsch | 273—155 |
| 2,337,594 | 12/1943 | Easley. | |
| 2,634,132 | 4/1953 | Freedman | 273—152.1 X |

DELBERT B. LOWE, *Primary Examiner.*

LEONARD W. VARNER, *Examiner.*